US012773848B2

(12) United States Patent
Eto

(10) Patent No.: US 12,773,848 B2
(45) Date of Patent: Oct. 27, 2026

(54) PRINTING UNIT AND RECORDING APPARATUS

(71) Applicant: KYOCERA CORPORATION, Kyoto (JP)

(72) Inventor: Daisuke Eto, Osaka (JP)

(73) Assignee: KYOCERA CORPORATION, Kyoto (JP)

(*) Notice: Subject to any disclaimer, the term of this patent is extended or adjusted under 35 U.S.C. 154(b) by 162 days.

(21) Appl. No.: 18/859,999

(22) PCT Filed: Apr. 11, 2023

(86) PCT No.: PCT/JP2023/014773
§ 371 (c)(1),
(2) Date: Oct. 25, 2024

(87) PCT Pub. No.: WO2023/210359
PCT Pub. Date: Nov. 2, 2023

(65) Prior Publication Data

US 2025/0289230 A1 Sep. 18, 2025

(30) Foreign Application Priority Data

Apr. 27, 2022 (JP) ................................ 2022-073570

(51) Int. Cl.
*B41J 2/17* (2006.01)
*B41J 2/21* (2006.01)

(52) U.S. Cl.
CPC ........... *B41J 2/1721* (2013.01); *B41J 2/2114* (2013.01)

(58) Field of Classification Search
CPC ... B41J 2/1433; B41J 2/145; B41J 2/15; B41J 2/155; B41J 2/17; B41J 2/1721;
(Continued)

(56) References Cited

U.S. PATENT DOCUMENTS 5,619,237 A 4/1997 Inoue et al.
6,336,709 B1 1/2002 Inoue et al.
(Continued)

FOREIGN PATENT DOCUMENTS

CN 107405914 A 11/2017
JP H08-058107 A 3/1996
(Continued)

*Primary Examiner* — Anh T Vo
(74) *Attorney, Agent, or Firm* — HAUPTMAN HAM, LLP

(57) ABSTRACT

A printing unit includes a carriage which reciprocates in a main scanning direction, a plurality of ink heads mounted on the carriage and arranged in at least one column along the main scanning direction, and a plurality of tanks mounted on the carriage along the main scanning direction. The plurality of ink heads include a pair of first ink heads at both ends in the main scanning direction and configured to discharge ink of a same color, and the plurality of tanks include a first tank accommodating ink of a color corresponding to the pair of first ink heads. In the carriage, an arrangement range in which the plurality of tanks are disposed includes the same region in the main scanning direction as an arrangement range in which the plurality of ink heads are disposed, and the first tank is disposed at a central portion in the main scanning direction.

13 Claims, 10 Drawing Sheets

(58) Field of Classification Search
CPC ...... B41J 2/175; B41J 2/2114; B41J 2202/19; B41J 2202/20; B41J 19/142; B41J 25/001; B41J 24/34
See application file for complete search history.

(56) References Cited

U.S. PATENT DOCUMENTS

| | | | | |
|---|---|---|---|---|
| 6,361,158 | B1 | 3/2002 | Inoue et al. | |
| 7,090,327 | B1 * | 8/2006 | Duffield | B41J 2/17509 347/30 |
| 2002/0118248 | A1 | 8/2002 | Inoue et al. | |
| 2003/0117468 | A1 | 6/2003 | Inoue et al. | |
| 2005/0012780 | A1 * | 1/2005 | Gil | B41J 2/2103 347/43 |
| 2005/0243121 | A1 | 11/2005 | Onishi | |
| 2006/0044371 | A1 | 3/2006 | Inoue et al. | |
| 2008/0259144 | A1 | 10/2008 | Inoue et al. | |
| 2010/0265306 | A1 | 10/2010 | Inoue et al. | |
| 2015/0328911 | A1 * | 11/2015 | Garcia Maza | B41J 25/001 347/37 |
| 2018/0009225 | A1 | 1/2018 | Ohara | |

FOREIGN PATENT DOCUMENTS

| | | | |
|---|---|---|---|
| JP | 2005-280110 | A | 10/2005 |
| JP | 2016-210115 | A | 12/2016 |
| JP | 2020-199673 | A | 12/2020 |
| WO | 03043825 | A1 | 5/2003 |

* cited by examiner

PRINTING UNIT AND RECORDING APPARATUS

RELATED APPLICATIONS

The present application is a National Phase of International Application No. PCT/JP2023/014773 filed Apr. 11, 2023, which claims priority to Japanese Application No. 2022-073570, filed Apr. 27, 2022.

TECHNICAL FIELD

The present disclosure relates to a printing unit and a recording apparatus including an ink head mounted on a carriage that moves in a main scanning direction.

BACKGROUND OF INVENTION

An ink jet recording apparatus such as an ink jet printer includes a printing unit that performs printing on a recording medium. The printing unit includes an ink head that discharges ink for image formation toward a recording medium. When the recording medium has a large width, the ink head is mounted on a carriage that reciprocates in a main scanning direction. In printing, the recording medium is intermittently fed in a predetermined direction (sub scanning direction), and the ink is discharged from the ink head while the carriage is reciprocated in the main scanning direction while the recording medium is stopped. As disclosed in Patent Document 1, there is known a technique in which a tank accommodating ink is mounted on a carriage similarly to an ink head.

CITATION LIST

Patent Literature

Patent Document 1: JP H08-058107 A

SUMMARY

A printing unit according to an aspect of the present disclosure includes a carriage which reciprocates in a main scanning direction, a plurality of ink heads which are mounted on the carriage to be arranged in at least one column along the main scanning direction and discharge ink, and a plurality of tanks which are mounted on the carriage to be disposed along the main scanning direction and accommodate ink. The plurality of ink heads include a pair of first ink heads disposed at both ends in the main scanning direction and configured to discharge ink of a same color, and the plurality of tanks include a first tank accommodating ink of a color corresponding to the pair of first ink heads. In the carriage, an arrangement range in which the plurality of tanks are disposed is set to include the same region in the main scanning direction as an arrangement range in which the plurality of ink heads are disposed, and the first tank is disposed at a central portion in the main scanning direction among the plurality of tanks.

A recording apparatus according to another aspect of the present disclosure includes the printing unit described above and a conveying portion that transports a recording medium in a direction intersecting the main scanning direction.

DESCRIPTION OF EMBODIMENTS

Hereinafter, a printing unit according to each embodiment of the present disclosure will be described with reference to the drawings. In these embodiments, as a specific example of an apparatus including a printing unit, an ink jet printer (recording apparatus) including an ink head which discharges ink for forming an image onto a wide and long recording medium will be exemplified. The ink jet printer is suitable for digital textile printing in which an image such as characters or a pattern is printed on a recording medium made of a fabric such as a woven fabric or a knitted fabric by an ink jet method. Of course, the printing unit according to the present disclosure can also be used for printing various images on a recording medium such as a paper sheet or a resin sheet.

Overall Configuration of Ink Jet Printer

Figure 1:
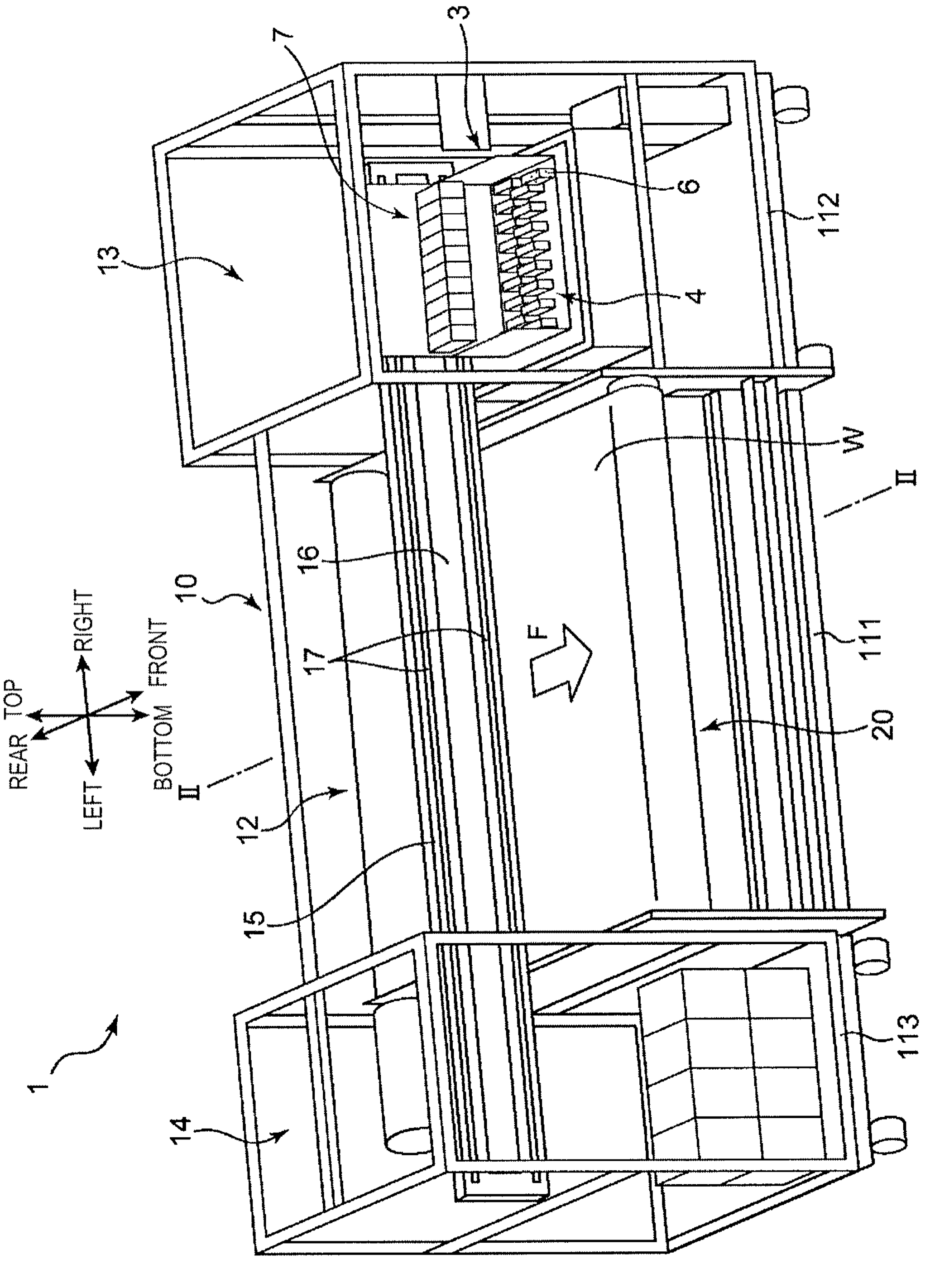
FIG. 1 is a perspective view illustrating an overall configuration of an ink jet recording apparatus according to an embodiment of the present disclosure.
Figure 2:
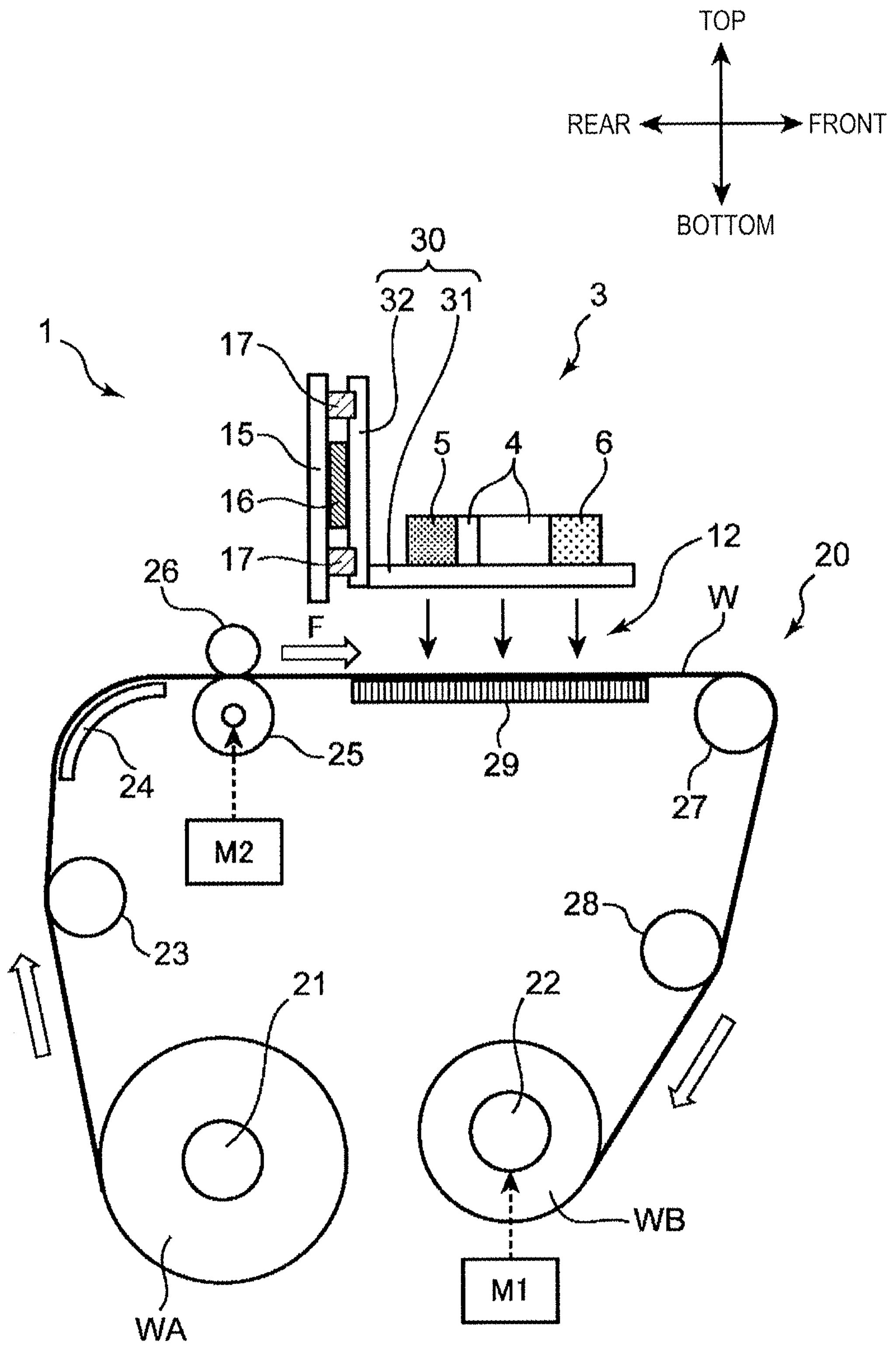
FIG. 2 is a schematic cross-sectional view taken along line II-II in FIG. 1.

FIG. 1 is a perspective view illustrating an overall configuration of an ink jet printer 1 according to a first embodiment of the present disclosure, and FIG. 2 is a schematic cross-sectional view taken along line II-II in FIG. 1. The ink jet printer 1 (printing unit) is a printer that performs printing of an image on a wide and long workpiece W (recording medium) by an ink jet method, and includes a device frame 10, a workpiece conveying portion 20 (conveying portion) incorporated in the device frame 10, and a carriage 3. In the present embodiment, the left-right direction is a main scanning direction S (FIG. 3) during printing on the workpiece W, and the direction from the rear toward the front is a sub scanning direction (a conveyance direction F of the workpiece W that is a direction intersecting the main scanning direction S).

The device frame 10 forms a framework for mounting various constituent members of the ink jet printer 1. The workpiece conveying portion 20 is a mechanism that intermittently feeds (conveys) the workpiece W so that the workpiece W advances in the conveyance direction F from the rear to the front in a printing region where the ink jet printing processing is performed. The carriage 3 is mounted with an ink head 4, a pre-processing head 5, a post-processing head 6, and a sub-tank 7, and reciprocates in the main scanning direction S (left-right direction) intersecting the conveyance direction F of the workpiece W during the ink jet printing processing. The movable unit constitutes the printing unit of the present disclosure.

The device frame 10 includes a center frame 111, a right frame 112, and a left frame 113. The center frame 111 forms a framework on which various constituent members of the ink jet printer 1 are mounted, and has a left-right width corresponding to the workpiece conveying portion 20. The right frame 112 and the left frame 113 are erected on the right side and the left side of the center frame 111, respectively. A space between the right frame 112 and the left frame 113 is a printing area 12 in which the printing processing is executed on the workpiece W.

The right frame 112 forms a maintenance area 13. The maintenance area 13 is an area in which the carriage 3 is retracted when the printing processing is not executed. In the maintenance area 13, nozzles (discharge holes) of the ink heads 4, the pre-processing head 5, and the post-processing head 6 are subjected to cleaning processing, purging processing, and the like, and are capped. The left frame 113 forms a return area 14 of the carriage 3. The return area 14 is a region into which the carriage 3, which has main-scanned the printing area 12 from the right to the left in the printing processing, temporarily enters when performing the main scanning in the reverse direction.

A carriage guide 15 for causing the carriage 3 to reciprocate in the left-right direction is assembled on the upper side of the device frame 10. The carriage guide 15 is a flat plate shape member that is long in the left-right direction, and is disposed above the workpiece conveying portion 20. A timing belt 16 is attached to the carriage guide 15 so as to be capable of circumferential movement in the left-right direction (main scanning direction). The timing belt 16 is an endless belt and is driven so as to circulate in the left direction or the right direction.

The carriage guide 15 is provided with a pair of upper and lower guide rails 17 which hold the carriage 3 in a state where the carriage 3 can reciprocate in the main scanning direction S so as to extend in parallel in the left-right direction. The carriage 3 is engaged with the guide rails 17. The carriage 3 is fixed to the timing belt 16. The carriage 3 moves in the left direction or the right direction along the carriage guide 15 while being guided by the guide rails 17 as the timing belt 16 moves in a left or right circumferential direction.

Referring mainly to FIG. 2, the workpiece conveying portion 20 includes a feeding roller 21 feeding the workpiece W before printing and a winding roller 22 winding the workpiece W after printing. The feeding roller 21 is disposed at a rear lower portion of the device frame 10 and is a winding shaft of a feeding roll WA that is a wound body of the workpiece W before printing. The winding roller 22 is disposed at a front lower portion of the device frame 10 and is a winding shaft of a winding roll WB that is a wound body of the workpiece W after being subjected to the printing processing. A first motor M1 rotationally driving the winding roller 22 around the shaft and causing the winding roller 22 to execute a winding operation of the workpiece W is attached to the winding roller 22.

A path between the feeding roller 21 and the winding roller 22 and passing through the printing area 12 serves as a conveyance path of the workpiece W. In the conveyance path, a first tension roller 23, a workpiece guide 24, a conveyance roller 25 and a pinch roller 26, a return roller 27, and a second tension roller 28 are disposed in this order from the upstream side. The first tension roller 23 applies a predetermined tension to the workpiece W on the upstream side of the conveyance roller 25. The workpiece guide 24 changes the conveyance direction of the workpiece W from the upward direction to the forward direction and conveys the workpiece W into the printing area 12.

The conveyance roller 25 is a roller that generates a conveying force for intermittently feeding the workpiece W in the printing area 12. The conveyance roller 25 is rotationally driven around the shaft by a second motor M2, and intermittently conveys the workpiece W in the forward direction (predetermined conveyance direction F) so that the workpiece W passes through the printing area 12 (image forming position) facing the carriage 3. The pinch roller 26 is disposed to face the conveyance roller 25 from above, and forms a conveyance nip portion with the conveyance roller 25.

The return roller 27 changes the conveyance direction of the workpiece W that has passed through the printing area 12 from the forward direction to the downward direction, and guides the workpiece W after the printing processing to the winding roller 22. The second tension roller 28 applies a predetermined tension to the workpiece W on the downstream side of the conveyance roller 25. A platen 29 is disposed below the conveyance path of the workpiece W in the printing area 12.

The carriage 3 reciprocates in the main scanning direction S (in the present embodiment, the left-right direction) that intersects (in the present embodiment, is orthogonal to) the conveyance direction F in a state of being cantilevered by the guide rails 17. The carriage 3 includes a carriage frame 30, and the ink head 4, the pre-processing head 5, the post-processing head 6, and the sub-tank 7 which are mounted on the carriage frame 30. The carriage frame 30 includes a head support frame 31 and a back frame 32.

The head support frame 31 is a horizontal plate holding the above-described heads 4 to 6. The back frame 32 is a vertical plate extending upward from a rear end edge of the head support frame 31. As described above, the timing belt 16 is fixed to the back frame 32. The guide rails 17 are engaged with the back frame 32. That is, in the present embodiment, the back frame 32 is an engagement portion held by the guide rails 17 in a cantilever state. The head support frame 31 is a horizontal plate whose rear end side is supported on the guide rails 17 in a cantilever manner by the engagement portion.

The cantilever state indicates a state in which an engagement portion (back frame 32) which is a portion held by the guide rails 17 which are holding members exists only on one side of the upstream side or the downstream side from the center of the carriage 3 in the conveyance direction F in the carriage 3, and another engagement portion does not exist on the side opposite to the side on which the engagement portion exists. The engagement portion may be disposed outside the range where the ink head 4 and the processing head are disposed in the conveyance direction F. That is, the engagement portion may be disposed only on the upstream side or only on the downstream side in the conveyance direction F with respect to the range in which the ink head 4 and the processing head are disposed.

Details of Carriage

Figure 3:
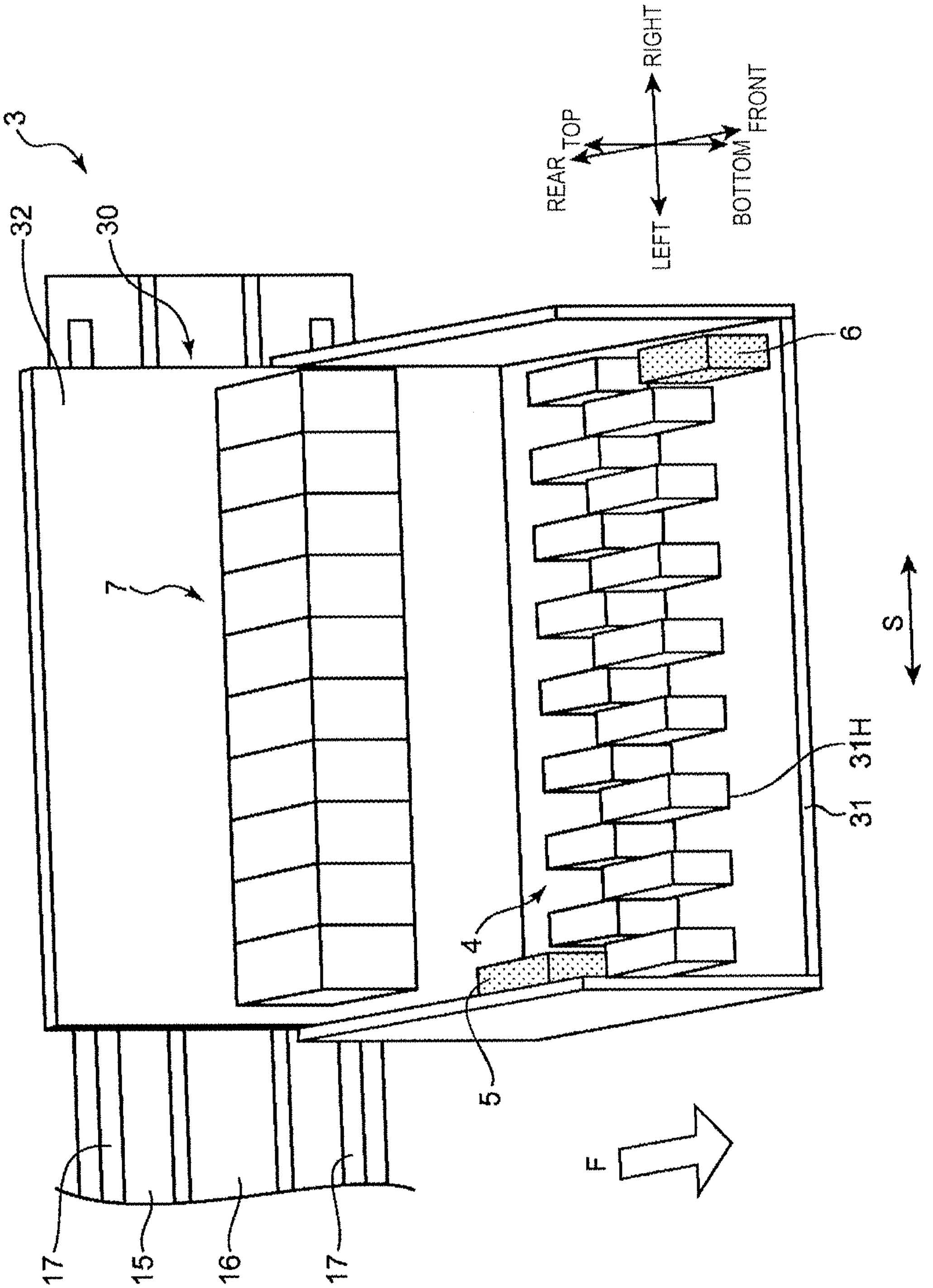
FIG. 3 is an enlarged perspective view of a carriage illustrated in FIG. 1.

The carriage 3 will be further described. FIG. 3 is an enlarged perspective view of the carriage 3 illustrated in FIG. 1. FIG. 3 illustrates the conveyance direction F (sub scanning direction) of the workpiece W and a main scanning direction S that is a movement direction of the carriage 3.

FIG. 3 illustrates an example in which a plurality of the ink heads 4 that discharge ink for image formation onto the workpiece W, the pre-processing head 5 and the post-processing head 6 that discharge non-color-developing processing liquid, and a plurality of the sub-tanks 7 that supply the ink and the processing liquid to these heads 4 to 6 are mounted on the carriage 3.

Each of the ink heads 4 includes a large number of nozzles (ink discharge holes) for discharging ink droplets by a discharge method such as a piezoelectric method using a piezoelectric element or a thermal method using a heating element, and an ink passage for guiding ink to the nozzles. As the ink, for example, an aqueous pigment ink containing an aqueous solvent, a pigment, and a binder resin can be used. The plurality of ink heads 4 in the present embodiment are each capable of discharging eight colors of ink. The ink heads 4 are mounted on the head support frame 31 of the carriage 3 so as to be arranged in two columns in the main scanning direction S. The ink head 4 for each color has two heads. The arrangement of the ink heads 4 will be described in detail below.

The pre-processing head 5 and the post-processing head 6 are disposed at positions different from the ink head 4 in the conveyance direction F. The pre-processing head 5 is disposed on the upstream side of the ink head 4 in the conveyance direction F. FIG. 3 illustrates an example in which one pre-processing head 5 is disposed near the right end of an array of the ink heads 4. Similarly, the post-processing head 6 is disposed on the downstream side of the ink head 4 in the conveyance direction F. FIG. 3 illustrates an example in which one post-processing head 6 is disposed at the right end of the array of the ink heads 4. In another embodiment, a plurality of the pre-processing heads 5 or a plurality of the post-processing heads 6 may be disposed. The carriage 3 is provided with at least one pre-processing head 5 and at least one post-processing head 6. In another embodiment, the pre-processing head 5 and the post-processing head 6 may not be disposed.

In addition, a series of heads along the main scanning direction S, which is configured by the ink head 4, the pre-processing head 5, and the post-processing head 6, is referred to as a column of heads or simply as a column. A series of heads along the conveyance direction F, which is configured by the ink head 4, the pre-processing head 5, and the post-processing head 6, is referred to as a row of heads or simply a row.

The pre-processing head 5 discharges the pre-processing liquid for applying predetermined pre-processing to the workpiece W. The pre-processing liquid is discharged from the pre-processing head 5 to a position of the workpiece W to which the ink has not been discharged from the ink head 4. The pre-processing liquid is a non-color-developing processing liquid that does not develop a color even when adhering to the workpiece W, and is processing liquid exhibiting, for example, a function of enhancing the fixability of the ink to the workpiece W and/or the aggregation property of an ink pigment. As such pre-processing liquid, processing liquid in which a binding resin is blended in a solvent, processing liquid in which a cationic resin positively charged is blended in a solvent, or the like can be used.

The post-processing head 6 discharges a post-processing liquid for applying predetermined post-processing to the workpiece W to which the ink has adhered. The post-processing liquid is discharged from the post-processing head 6 to a position of the workpiece W after the ink is discharged from the ink head 4. Similarly, the post-processing liquid is a non-color-developing processing liquid that does not develop a color even when adhered to the workpiece W, and is a processing liquid that exhibits a function of enhancing the fixability and robustness (resistance to rubbing and scraping) of the ink image printed on the workpiece W by the ink head 4. As such a post-processing liquid, a silicone-based processing liquid or the like can be used. Note that the post-processing liquid and the pre-processing liquid are different processing liquids. Specifically, components contained in the post-processing liquid are different from those contained in the pre-processing liquid.

Here, the non-color-developing processing liquid refers to processing liquid that is not recognized by a person by the naked eye as having developed color when printed alone on the recording medium. Here, the color includes a color having a saturation of 0, such as black, white, and gray. The non-color-developing processing liquid is basically a transparent liquid, but for example, when one liter of the processing liquid is viewed in a liquid state, the non-color-developing processing liquid may not be completely transparent and may appear slightly white or the like. Since such a color is very light, a person cannot recognize that the color is developed by the naked eye when the color is printed alone on the recording medium. Depending on the type of processing liquid, when printed alone on the recording medium, there may be changes in the recording medium such as a glossy appearance, but such a state is not considered to be color development.

In the present embodiment, the pre-processing liquid and the post-processing liquid may be discharged onto substantially the entire surface of the workpiece W, or the pre-processing liquid and the post-processing liquid may be selectively discharged in accordance with the image to be printed, similarly to the ink.

A case where the pre-processing liquid and the post-processing liquid are selectively discharged will be described. As described above, the pre-processing liquid, the ink, and the post-processing liquid are discharged in this order onto the workpiece W in the portion where the color is printed in accordance with the image. In this case, the ink may have one color or a plurality of colors. Basically, neither the pre-processing liquid nor the post-processing liquid is discharged to a portion where no color is printed, that is, a portion where no ink is discharged. In addition, in order to adjust the image quality of the image to be printed, the texture of the workpiece W, or the like, a part of the selection of the discharge of the pre-processing liquid and the post-processing liquid may be different from that of the discharge of the ink.

As illustrated in FIG. 3, an opening 31H is provided at a position of the head support frame 31 where the head is disposed. The ink head 4, the pre-processing head 5, and the post-processing head 6 are assembled to the head support frame 31 so as to be fitted into each opening 31H. Nozzles disposed on the lower end surfaces of the heads 4, 5, and 6 are exposed from each opening 31H.

The sub-tank 7 is supported by the carriage 3 above the heads 4, 5, and 6 via a holding frame (not illustrated). The sub-tank 7 is provided corresponding to each of the heads 4, 5, and 6. Each sub-tank 7 is supplied with the ink or the processing liquid from a cartridge or a main tank (not illustrated) in which the ink and the processing liquid are accommodated, and supplies the ink or the processing liquid to each of the heads 4, 5, and 6. Each of the sub-tanks 7 and the heads 4, 5, and 6 are connected by a pipe line not illustrated in FIG. 3 (see a pipe line P in FIG. 6).

As described above, in the present embodiment, the ink jet printer 1 is an all-in-one type printer in which three types of heads of the ink heads 4, the pre-processing head 5, and the post-processing head 6 are mounted on one carriage 3. According to the ink jet printer 1, for example, in printing processing in which ink jet printing is performed on a fabric in digital textile printing, the discharge processing of the pre-processing liquid and the discharge process of the post-processing liquid can be integrally executed. Thus, the printing processing can be simplified and the printing device can be made compact.

Printing Method

Figure 4:
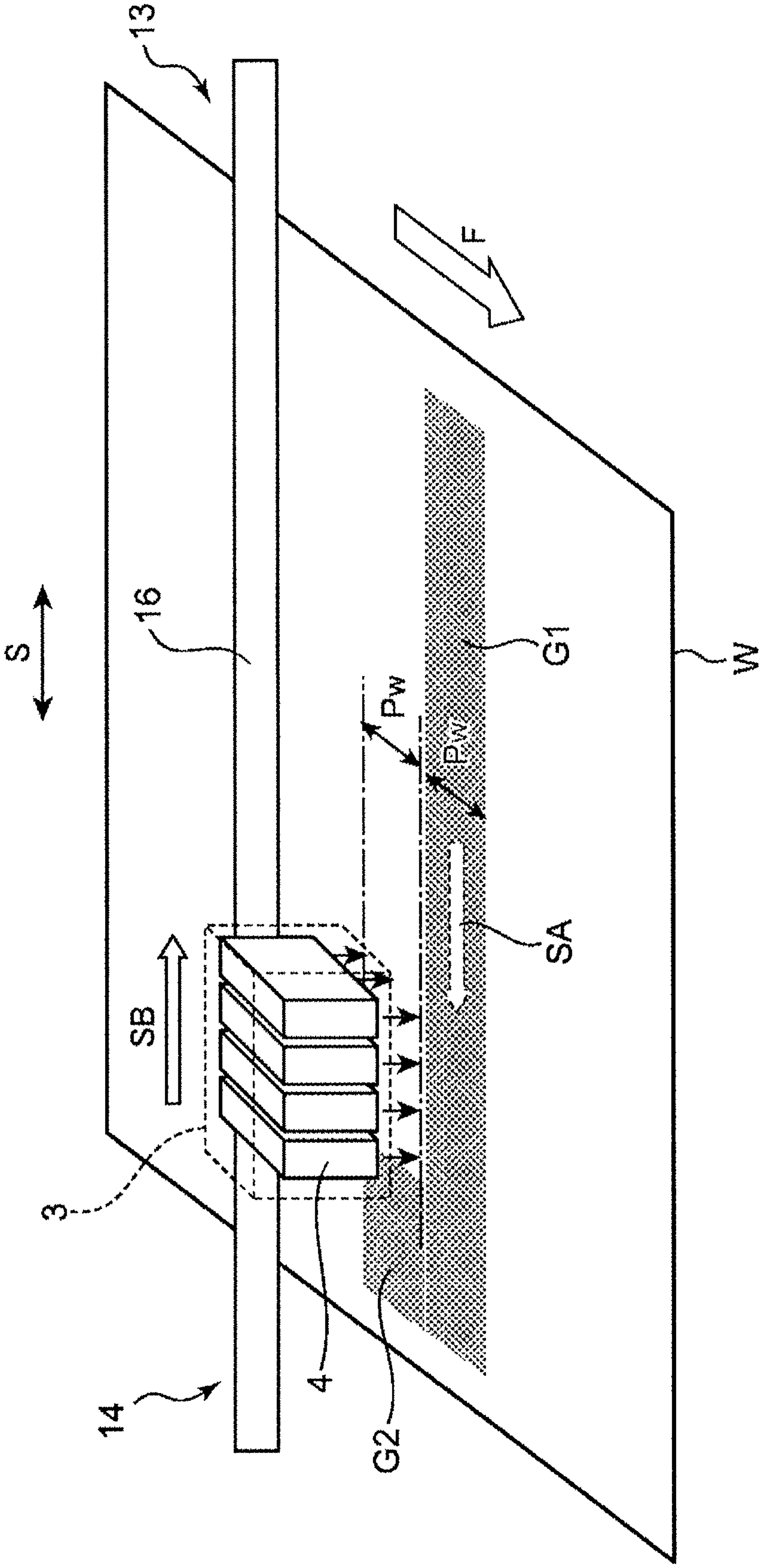
FIG. 4 is a schematic diagram illustrating a serial printing method adopted in an embodiment of the present disclosure.

A printing method executed by the ink jet printer 1 according to the present embodiment will be described. The ink jet printer 1 performs printing processing on the workpiece W by a serial printing method. FIG. 4 is a schematic diagram illustrating the serial printing method. In FIG. 4, the carriage 3 is illustrated in a simplified manner by omitting the pre-processing head 5 and the post-processing head 6.

Figure 5A:
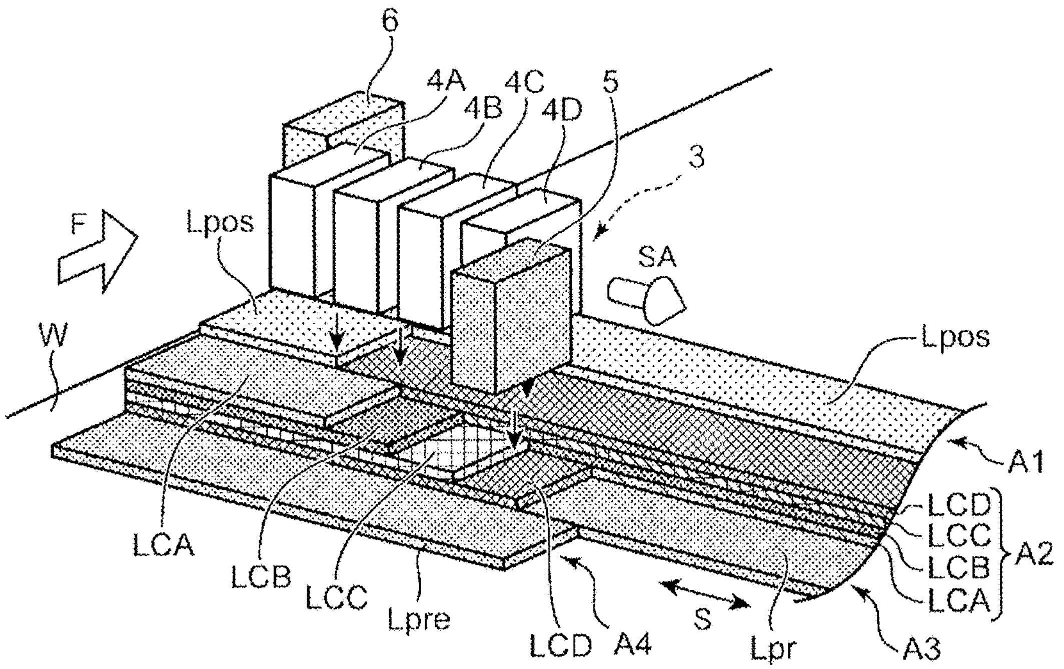
FIG. 5A is a schematic diagram illustrating a printing state in a forward path and a backward path of the carriage.
Figure 5B:
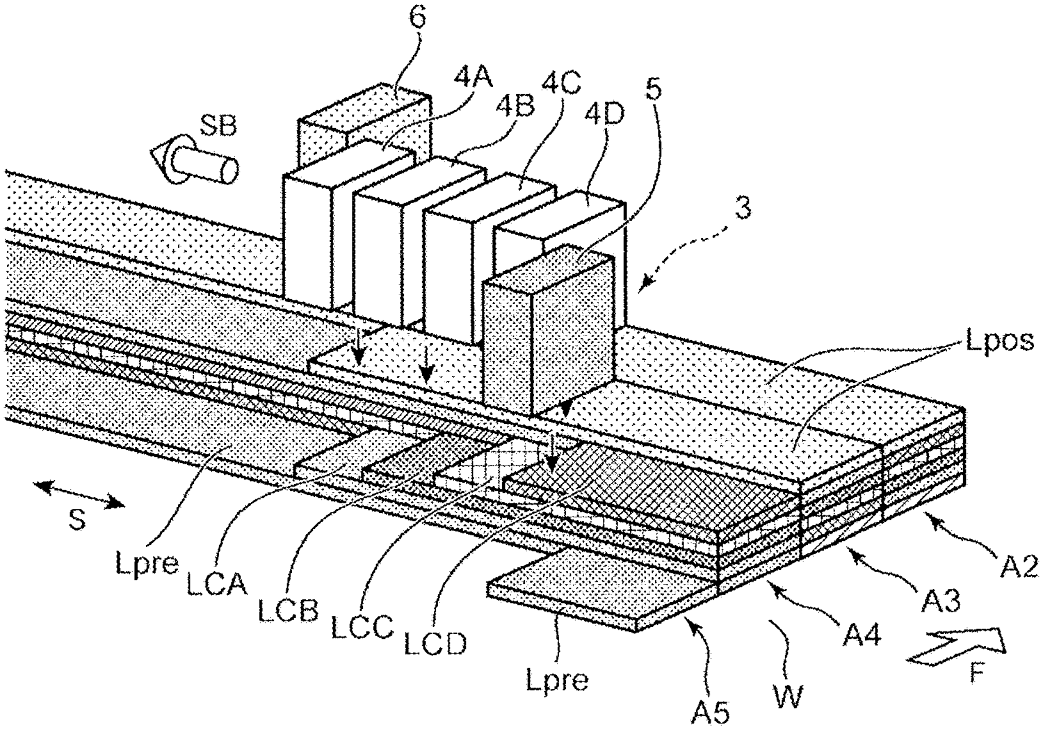
FIG. 5B is a schematic diagram illustrating a printing state in the forward path and the backward path of the carriage.

When the workpiece W has a wide size, printing cannot be performed while the workpiece W is continuously fed. The serial printing method is a printing method in which reciprocating movement of the carriage 3 on which the ink heads 4 of the respective colors are mounted in the main scanning direction S and intermittent feeding of the workpiece W in the conveyance direction F are repeated. Here, it is assumed that the ink head 4 has a predetermined printing width Pw in the conveyance direction F. The printing width Pw is substantially equal to the length in the conveyance direction F of the region where the ink discharge nozzles of the ink head 4 are disposed. In FIG. 4 and FIG. 5A and FIG. 5B which will be described next, the length of each of the heads in the conveyance direction F and the printing width Pw are drawn to be substantially equal, but in practice, the length of the head in the conveyance direction F is larger than the printing width Pw and the length of the discharge nozzle arrangement region in the conveyance direction F.

FIG. 4 illustrates a state in which the carriage 3 has moved in a forward path direction SA in the main scanning direction S, and the printing of a band-like image G1 with the printing width Pw has been completed. During the main scanning in the forward path direction SA, the feeding of the workpiece W is stopped. After the printing of the band-like image G1, the workpiece W is fed in the conveyance direction F by a pitch corresponding to the printing width Pw. At this time, the carriage 3 stands by in the return area 14 on the left end side. After the workpiece W is fed out, the carriage 3 turns back in a backward path direction SB in accordance with the reverse movement of the timing belt 16. The workpiece W is in a stopped state. Then, as illustrated in FIG. 4, the carriage 3 prints the band-like image G1 having the printing width Pw on the upstream side of a band-like image G2 while moving in the backward path direction SB. Thereafter, the same operation is repeated.

FIG. 5A and FIG. 5B are schematic diagrams illustrating a printing state in the forward path and the backward path of the carriage 3. Here, the ink head 4, the pre-processing head 5, and the post-processing head 6 mounted on the carriage 3 are illustrated in a simplified manner. The ink head 4 includes first, second, third, and fourth ink heads 4A, 4B, 4C, and 4D for discharging inks of first, second, third, and fourth colors different from each other, and the first to fourth ink heads 4A to 4D are arranged in a column in the main scanning direction S. The pre-processing head 5 and the post-processing head 6 are disposed on the upstream side and the downstream side, respectively, of the ink head 4 in the conveyance direction F. As in the case described with reference to FIG. 4, the workpiece W is fed in the conveyance direction F between the printing of the forward path and the printing of the backward path. The moving distance in the conveyance direction F at this time is an interval pitch (head pitch) between the heads adjacent to each other in the conveyance direction F. This moving distance is also the printing width Pw of each of the heads 4, 5, and 6.

FIG. 5A illustrates a state in which the printing operation is performed while the carriage 3 moves in the forward path direction SA in the main scanning direction S (forward path main scanning). The region A4 on the workpiece W faces the pre-processing head 5 mounted on the most upstream side of the carriage 3. In the current forward path main scanning, a pre-processing layer Lpre is formed on the region A4 by the pre-processing liquid discharged from the pre-processing head 5.

The region A3 is a region on the downstream side of the region A4 by one head pitch, and faces the ink head 4. On the region A3, the pre-processing layer Lpre has already been formed over the entire length in the main scanning direction by the previous backward path main scanning. In the current forward path main scanning, first, second, third, and fourth ink layers LCA, LCB, LCC, and LCD are formed on the pre-processing layer Lpre of the region A3 by the first to fourth color inks sequentially discharged in the arrangement order of the first to fourth ink heads 4A to 4D. In FIG. 5A, in order to facilitate understanding, the fourth to first ink layers LCD to LCA are illustrated so as to be sequentially stacked, and are not actually stacked. The above-described pre-processing layer Lpre and the after-mentioned post-processing layer Lpos are not formed on the workpiece W.

The region A2 is a region on the downstream side by one head pitch from the region A3, and faces the post-processing head 6 mounted on the most downstream side of the carriage 3. On the region A2, the pre-processing layer Lpre formed by the previous forward path main scanning and the first to fourth ink layers LCA to LCD formed by the previous backward path main scanning are already formed over the entire length in the main scanning direction. In the current forward path main scanning, the post-processing layer Lpos is formed on the first to fourth ink layers LCA to LCD of the region A2 by the post-processing liquid discharged from the post-processing head 6.

The region A1 is a region on the downstream side of the region A2 by one head pitch, and is a region where the carriage 3 has passed and the printing processing has been completed. That is, in the region A1, the pre-processing layer Lpre, the first to fourth ink layers LCA to LCD, and the post-processing layer Lpos are formed over the entire length in the main scanning direction.

FIG. 5B illustrates a state in which, after the forward path main scanning of FIG. 5A is finished, the carriage 3 turns back and performs the backward path main scanning while moving in the backward path direction SB. Before the turn-back movement, the workpiece W is fed in the conveyance direction F by one head pitch. The region A5 on the workpiece W is a region on the upstream side by one head pitch from the region A4, and faces the pre-processing head 5 in the current backward path main scanning. The pre-processing layer Lpre is formed on the region A5 by the pre-processing liquid discharged from the pre-processing head 5.

In the region A4 and the region A3, the first to fourth ink layers LCA to LCD and the post-processing layer Lpos are formed on existing layers, respectively. To be specific, in the region A4, the first to fourth ink layers LCA to LCD are formed on the pre-processing layer Lpre. In the region A3, the post-processing layer Lpos is formed on the first to fourth ink layers LCA to LCD. The region A2 is a region in which the printing processing is completed, following the region A1.

The reason why the printing processing can be performed in both the forward path main scanning and the backward path main scanning as described above is that the pre-processing head 5 and the post-processing head 6 are disposed to be shifted in the conveyance direction F with respect to the ink head 4. If the pre-processing head 5, the ink head 4, and the post-processing head 6 are arranged in a column in this order in the main scanning direction S in the carriage 3, the printing processing in which the pre-processing liquid and the post-processing liquid can be deposited in a desired order can be realized only in one of the forward path main scanning and the backward path main scanning. In order to be able to perform printing processing in both directions, a pair of pre-processing heads 5 and post-processing heads 6 are disposed on each side of the array of ink heads 4. In this case, the length of the carriage 3 in the main scanning direction S is increased. Since such an arrangement is not necessary in the present embodiment, the length of the carriage 3 in the main scanning direction S can be reduced.

When the ink heads 4 are disposed in a plurality of columns, the amount of ink deposited on the workpiece W can be increased. For example, when there are two columns of the ink heads 4, printing can be performed as follows. After the first to fourth ink layers LCA to LCD are formed as described above by the ink heads 4 in the first column, the workpiece W is conveyed in the conveyance direction F by one head pitch, and the first to fourth ink layers LCA to LCD are formed by the ink heads 4 in the second column. In this manner, printing of an amount of ink corresponding to two layers on the workpiece W can be performed.

Figure 6:
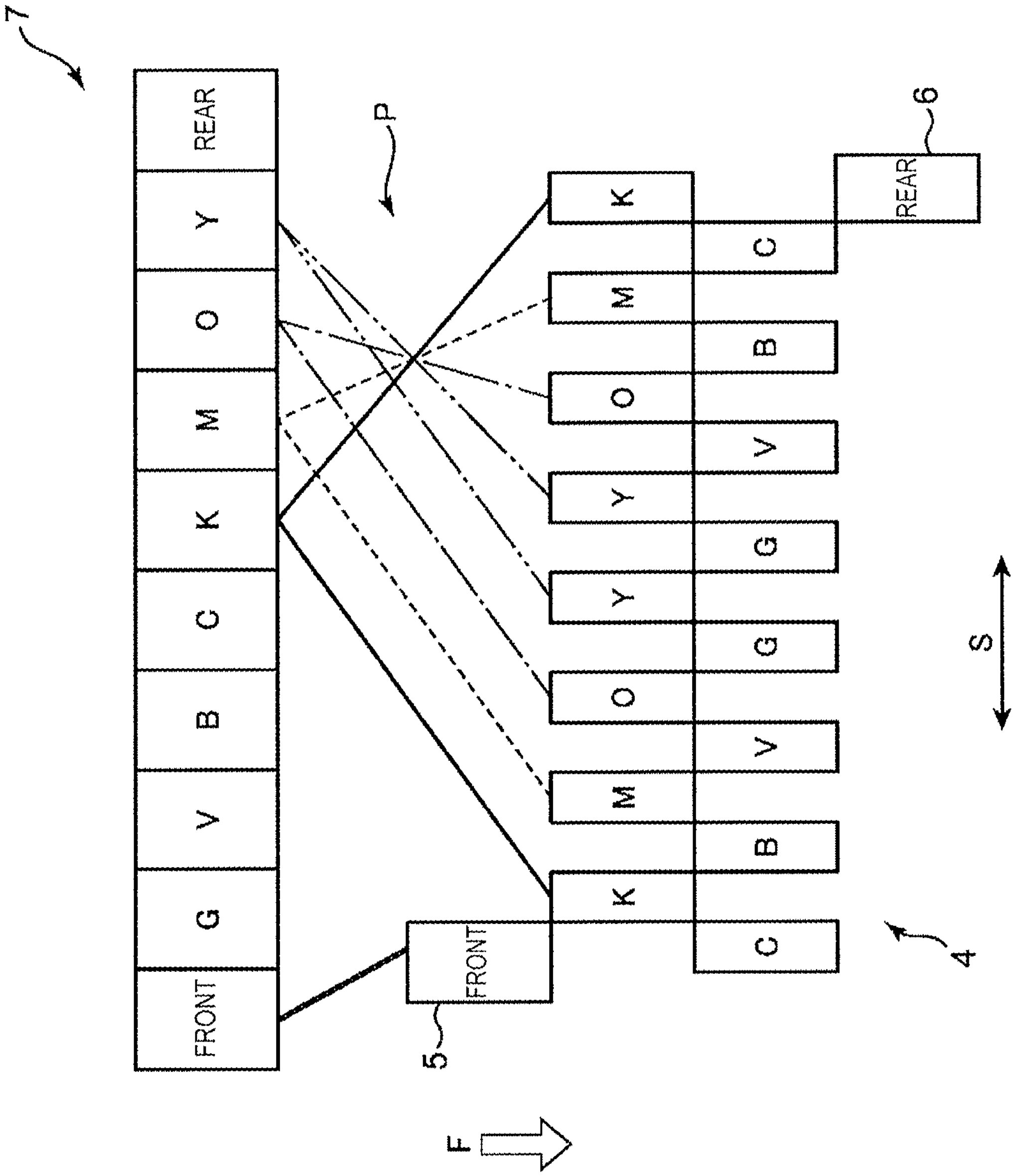
FIG. 6 is a plan view schematically illustrating an arrangement of an ink head, a processing head, and a tank on the carriage illustrated in FIG. 3, and is a view illustrating replenishing paths of ink and processing liquid.
Figure 7:
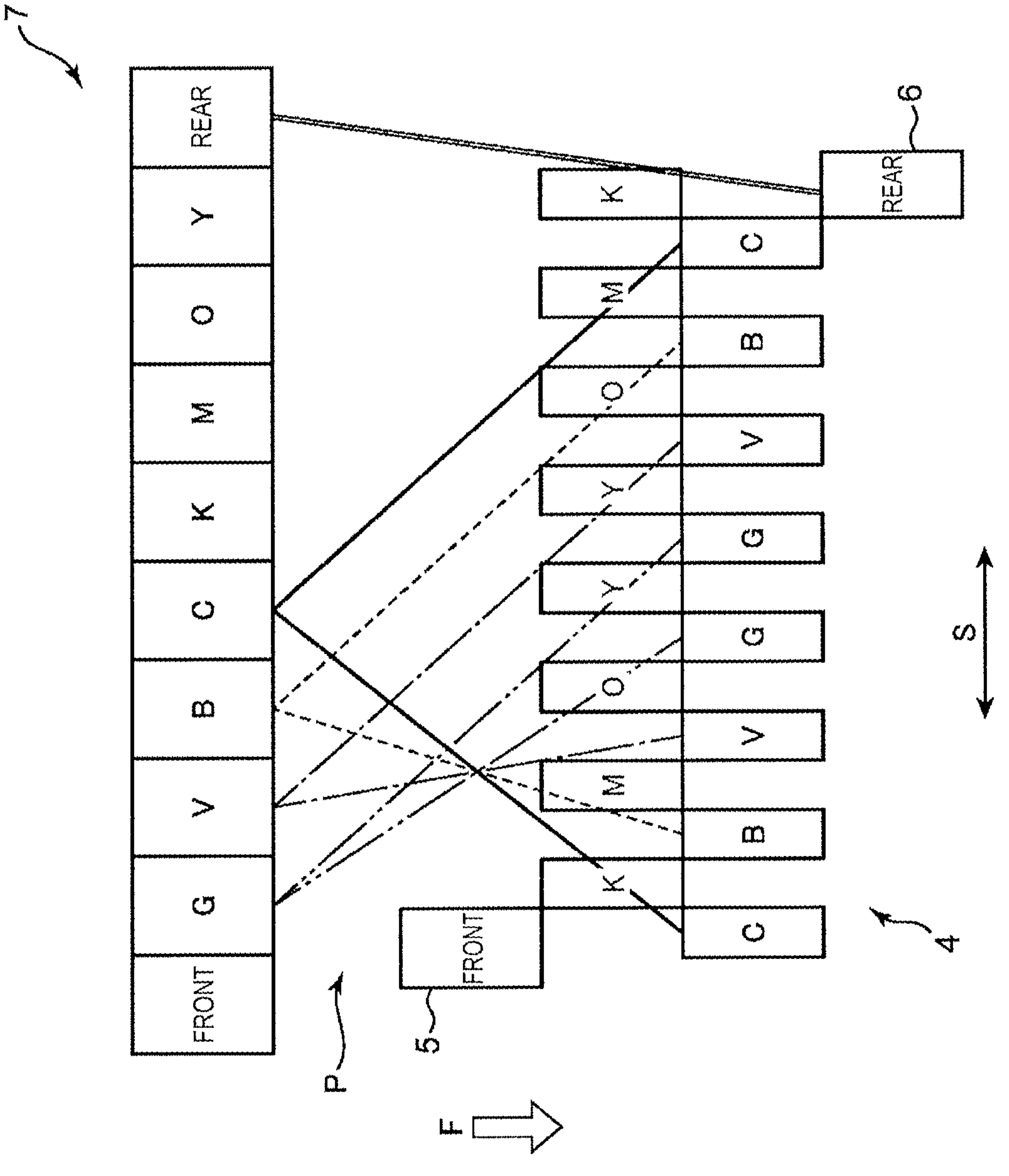
FIG. 7 is a plan view schematically illustrating an arrangement of an ink head, a processing head, and a tank on the carriage illustrated in FIG. 3, and is a view illustrating replenishing paths of ink and processing liquid.

FIGS. 6 and 7 are plan views schematically illustrating an arrangement of the ink head 4, the processing heads 5 and 6, and the sub-tank 7 on the carriage 3 illustrated in FIG. 3, and are views illustrating replenishing paths of the ink and the processing liquid. As described above, the carriage 3 is supported in a cantilever state by the guide rails 17 in the back frame 32 (FIG. 3). The back frame 32 is disposed on the upstream side of the head support frame 31 in the conveyance direction F. In the conveyance direction F, a side of the head support frame 31 on which the back frame 32 is disposed is referred to as a base end side, and a side of the head support frame 31 opposite to the base end side is referred to as a tip end side. As described above, the plurality of ink heads 4 that discharge eight colors of ink, the pre-processing head 5, and the post-processing head 6 are mounted on the head support frame 31 of the carriage 3. The ink head 4 of each color includes two unit heads (a total of 16 unit heads). One pre-processing head 5 and one post-processing head 6 are provided.

In FIG. 6, each of the sixteen ink heads 4 in total is labeled with an alphabet letter corresponding to the color of the ink to be discharged. More specifically, K means black, Y means yellow, M means magenta, C means cyan, B means blue, V means violet, O means orange, and G means green. In addition, "pre" is written for the pre-processing head 5, and "post" is written for the post-processing head 6. Similarly, regarding the plurality of sub-tanks 7, the sub-tank 7 accommodating the pre-processing liquid is denoted by "pre", the sub-tank 7 accommodating the post-processing liquid is denoted by "post", and the sub-tanks 7 accommodating the ink of the respective colors are denoted by alphabets in the same manner as described above. In practice, as illustrated in FIG. 3, the plurality of sub-tanks 7 are disposed at positions higher than the ink head 4, the pre-processing head 5, and the post-processing head 6. At this time, in the carriage 3, an arrangement range in which the plurality of sub-tanks 7 are disposed is set so as to overlap an arrangement range in which the plurality of ink heads 4 are disposed in a direction orthogonal to the main scanning direction S. In other words, in the main scanning direction S, the arrangement range of the plurality of sub-tanks 7 is disposed in the same region as the arrangement range of the plurality of ink heads 4. At this time, one of the compared arrangement ranges may be set to be wider than the other.

As illustrated in FIG. 6, the pre-processing head 5 is disposed upstream of the plurality of ink heads 4 in the conveyance direction F, and the post-processing head 6 is disposed downstream of the plurality of ink heads 4 in the conveyance direction F. The pre-processing head 5 is disposed at an end (left end) in the main scanning direction S of the arrangement range in which the plurality of ink heads 4 are disposed. On the other hand, the post-processing head 6 is disposed at an end (right end) in the main scanning direction S on the opposite side to the pre-processing head 5 in the arrangement range in which the plurality of ink heads 4 are disposed. As a result of the above-described head arrangement, the pre-processing head 5 and the post-processing head 6 are disposed within the range of the arrangement width of the ink head 4 in the main scanning direction S.

The plurality of ink heads 4 are disposed in two columns in the main scanning direction S. The ink heads 4 of colors K, M, O, and Y are disposed in a group of ink heads 4 in the first column on the side close to the pre-processing head 5. A pair of ink heads 4 of color K is disposed on the outermost side in the main scanning direction S, and similarly, a pair of ink heads 4 of color M, a pair of ink heads 4 of color O, and a pair of ink heads 4 of color Y are disposed in order on the inner side in the main scanning direction S. In other words, the ink heads 4 of the four colors are disposed symmetrically in the main scanning direction S.

The ink heads 4 of colors C, B, V, and Gare disposed in the group of ink heads 4 of the second column on the side close to the post-processing head 6. A pair of ink heads 4 of color C is disposed on the outermost side in the main scanning direction S, and similarly, a pair of ink heads 4 of color B, a pair of ink heads 4 of color V, and a pair of ink heads 4 of color G are disposed in order on the inner side in the main scanning direction S. In other words, the ink heads 4 of the four colors are also disposed symmetrically in the main scanning direction S.

As illustrated in FIG. 6, the group of ink heads 4 in the first column and the ink heads 4 in the second column are disposed so as to be shifted from each other in the main scanning direction S, and the ink heads 4 in one column are disposed between the adjacent ink heads 4 in the other column, so that the ink heads 4 in the first column and the ink heads 4 in the second column are disposed in a staggered manner as a whole. The pre-processing head 5 is disposed behind the ink head 4 of color C on the left side of the second column, and the post-processing head 6 is disposed in front of the ink head 4 of color K on the right side of the first column.

Furthermore, in the present preferred embodiment, two ink heads 4 that discharge ink of the same color are disposed in the same column. As a result, when the carriage 3 reciprocates in the main scanning direction, ink can be discharged from the two ink heads 4 to a predetermined pixel during scanning in the same direction. Therefore, as compared with the case where the two ink heads 4 are disposed in different columns, the difference in the landing time of the ink on the pixels can be reduced, and a stable image can be formed.

As illustrated in FIG. 6, the two ink heads 4 that discharge the same color ink are disposed in line symmetry in the main scanning direction S. Therefore, even in a case where the carriage 3 performs scanning in any direction of the right direction and the left direction, the same landing order of the ink of each color can be made, and a partial difference in color from occurring on the workpiece W can be prevented.

Unless otherwise specified, in the drawings including FIG. 6, the intervals between the heads adjacent to each other in the main scanning direction S (intervals between the centers of the heads) are the same as each other. Similarly, the intervals between the heads adjacent to each other in the conveyance direction F (the intervals between the centers of the heads) are the same as each other.

In the plurality of sub-tanks 7, the respective sub-tanks 7 of the pre-processing liquid, colors G, V, B, C, K, M, O, and Y, and the post-processing liquid are disposed in order from the left. That is, the sub-tank 7 of the pre-processing liquid (tank for pre-processing liquid) is disposed at the end in the main scanning direction S on the same side as the pre-processing head 5 with respect to the arrangement range in which the plurality of sub-tanks 7 are disposed. Similarly, the sub-tank 7 of the post-processing liquid (post-processing liquid tank) is disposed at the end in the main scanning direction S on the same side as the post-processing head 6 with respect to the arrangement range in which the plurality of sub-tanks 7 are disposed.

The sub-tanks 7 for eight colors of ink are disposed between the sub-tanks 7 for the pre-processing liquid and the post-processing liquid. As illustrated in FIG. 6, the four sub-tanks 7 on the right side of the eight sub-tanks 7 supply each ink to the ink heads 4 in the first column (FIG. 6). Of the eight sub-tanks 7, the four sub-tanks 7 on the left side supply each ink to the ink heads 4 in the second column (FIG. 7). Ink is supplied from the sub-tank 7 of one color to the two ink heads 4. In FIGS. 6 and 7, the pipe lines P for supplying the ink, the pre-processing liquid, and the post-processing liquid are respectively drawn by two straight lines (the line type is different for each liquid). It should be noted that the actual pipe line P is made of a rubber tube or the like, and therefore has a slightly curved portion.

Acceleration in the main scanning direction S acts on the liquid in the sub-tank 7 mounted on the carriage 3 that reciprocates in the main scanning direction S. Since the pipe line P is filled with the liquid such as the ink or the processing liquid, the acceleration acts on the liquid in the same manner as described above. In particular, as the distance between the sub-tank 7 as a supply source and the head as a receiving destination increases in the main scanning direction S, the pipe line P extends longer in the main scanning direction S, and thus the influence of the acceleration increases. When the carriage 3 is reversed in the main scanning direction S, if a large pressure is applied from the liquid in the pipe line P to the liquid in the head due to the acceleration, a pressure fluctuation occurs in the head. As a result, each liquid cannot be stably discharged from the head 4, 5, 6, and it may be difficult to form a favorable ink image on the recording medium.

As a result of diligent studies to minimize the influence of the acceleration when ink is supplied from one sub-tank 7 to two ink heads 4 that discharge ink of the same color, the inventors of the present disclosure have found the arrangement of the ink head 4, the pre-processing head 5, the post-processing head 6, and the sub-tank 7 as illustrated in FIGS. 6 and 7. That is, in the ink heads 4 in the first column, a pair of ink heads 4 of color K (a pair of first ink heads), which are the disposed as each other at both end portions in the main scanning direction S, are the most distant from each other. Therefore, the pipe line P is inevitably likely to be long. Therefore, as illustrated in FIG. 6, the sub-tank 7 (first tank) accommodating the ink of color K is disposed at the central portion in the main scanning direction S among the plurality of sub-tanks 7.

Note that the above-described central portion is a central one third of the range, more preferably one fifth of the range, of the range in which the plurality of sub-tanks 7 are disposed in the main scanning direction S. In the aspect in which the plurality of sub-tanks 7 are disposed at substantially equal intervals in the main scanning direction S, the arrangement of the first tank at the central portion also has the following meaning. When the number of the plurality of sub-tanks 7 is an odd number (2n+1), the first tank is disposed at the (n+1)-th position from the end in the main scanning direction S. When the number of the plurality of sub-tanks 7 is an even number (2n), the first tank is disposed at the n-th or (n+1)-th position from the end in the main scanning direction S.

As a result, the lengths of the pipe lines P for the two ink heads 4 of color K can be made equal to each other, and one of the pipe lines P can be prevented from being affected by a large acceleration, thereby reducing the pressure fluctuation.

In the group of ink heads 4 in the first column, for the remaining three pairs of ink heads 4 of colors M, O, and Y (a plurality of pairs of second ink heads), a plurality of sub-tanks 7 are disposed so that the ink heads 4 located outside in the main scanning direction S discharge ink from the sub-tanks 7 located relatively inside in the main scanning direction S. In other words, with respect to the plurality of sub-tanks 7 (the plurality of second tanks) of colors M, O, and Y, the sub-tank 7 accommodating the ink of the color corresponding to the ink head 4 located outside in the main scanning direction S among the three pairs of ink heads 4 is disposed at the same position as the sub-tank 7 accommodating the ink of the color corresponding to the ink head 4 located inside in the main scanning direction S or at a position closer to the sub-tank 7 (first tank) of color K. Therefore, the difference in the length of the pipe line P in the group of ink heads 4 in the first column can be minimized.

Similarly, as illustrated in FIG. 7, in the ink heads 4 in the second column, a pair of ink heads 4 of color C (a pair of first ink heads), which are the disposed at both ends in the main scanning direction S, are the most distant from each other, and therefore, the pipe line P is inevitably likely to be long. Therefore, the sub-tank 7 (first tank) accommodating the ink of color C is disposed at the central portion in the main scanning direction S among the plurality of sub-tanks 7. When the number of the sub-tanks 7 is an even number, as illustrated in FIGS. 6 and 7, the number of the sub-tanks 7 located at the central portion is two.

With the above-described arrangement, the lengths of the pipe lines P for the two ink heads 4 of color C can be made equal to each other, and one of the pipe lines P can be prevented from being affected by a large acceleration.

In the group of ink heads 4 in the second column, for the remaining three pairs of ink heads 4 of colors B, V, and G (a plurality of pairs of second ink heads), a plurality of sub-tanks 7 are disposed so that the ink heads 4 located outside in the main scanning direction S discharge ink from the sub-tanks 7 located relatively inside in the main scanning direction S. In other words, with respect to the plurality of sub-tanks 7 (second tanks) of colors B, V, and G, the sub-tank 7 accommodating the ink of the color corresponding to the ink head 4 located outside in the main scanning direction S among the three pairs of ink heads 4 is disposed at the same position as the sub-tank 7 accommodating the ink of the color corresponding to the ink head 4 located inside in the main scanning direction S or at a position closer to the sub-tank 7 (first tank) of color C.

The sub-tanks 7 may be disposed in order of colors G, V, B, C, K, M, O, and Y from the left in the main scanning direction S. In this case, the color B and the color M are interchanged from the arrangement of the sub-tanks in FIG. 7. In this arrangement, in the arrangement of the sub-tanks 7 with respect to the ink heads 4 in the first column, the sub-tanks 7 (second tanks) of color M and color O are disposed at the same distance with respect to the sub-tank 7 (first tank) of color K, and the sub-tank 7 (second tank) of color Y is disposed at a position farther than the sub-tanks 7 of color M and color O. The arrangement of the second tank may thus be at the same distance from the first tank.

In order to further suppress the influence of the large acceleration, the sub-tank 7 accommodating the ink of the color corresponding to the ink head 4 located on the outer side in the main scanning direction S is disposed at a position closer to the first tank than the sub-tank 7 accommodating the ink of the color corresponding to the ink head 4 located on the inner side in the main scanning direction S.

In the arrangement of FIG. 7, the sub-tanks 7 corresponding to the plurality of pairs of second ink heads in the first column are arranged in the order of colors M, O, and Yon the same side (right side) in the main scanning direction S with respect to the sub-tank 7 (first tank) accommodating the ink of color K corresponding to the pair of first ink heads in the first column. The sub-tanks 7 corresponding to the plurality of pairs of second ink heads in the second column are arranged in the order of colors B, V, and G on the same side (the left side, the side opposite to the first column) in the main scanning direction S with respect to the sub-tank 7 (first tank) accommodating the ink of color C corresponding to the pair of first ink heads in the second column. In such an arrangement, the sub-tank 7 accommodating the ink of the color corresponding to the ink head 4 located on the outer side in the main scanning direction S may be disposed at a position closer to the first tank than the sub-tank 7 accommodating the ink of the color corresponding to the ink head 4 located on the inner side in the main scanning direction S.

With the above-described arrangement, the liquid can be stably supplied from the disposed plurality of sub-tanks 7 in one column along the main scanning direction S to the ink heads 4 in two columns each extending in the main scanning direction S and disposed in the conveyance direction F. At this time, since the length of the pipe line P which is connected to each head can be shortened, the influence of acceleration which is received when the carriage 3 moves can be suppressed.

As illustrated in FIG. 7, the arrangement range of the group of ink heads 4 in the first column is shifted to the right side (one end side in the main scanning direction) with respect to the arrangement range of the group of ink heads 4 in the second column. The sub-tank 7 corresponding to the ink head 4 in the first column is disposed on the right side in the arrangement range of the sub-tank 7, and the sub-tank 7 corresponding to the ink head 4 in the second column is disposed on the left side (another end side opposite to the one end side in the main scanning direction) in the arrangement range of the sub-tank 7. In this manner, the distance between the sub-tank 7 and the ink head 4 in the main scanning direction can be further shortened, and the influence of the large acceleration can be further suppressed.

In FIGS. 6 and 7, the plurality of sub-tanks 7 are supply tanks for supplying the ink, the pre-processing liquid, and the post-processing liquid to the ink head 4, the pre-processing head 5, and the post-processing head 6. In this case, the pressure fluctuation in the ink head 4, the pre-processing head 5, and the post-processing head 6 can be reduced due to the influence of the acceleration acting along with the movement of the carriage 3. All or some of the plurality of sub-tanks 7 may be recovery tanks that recover the ink, the pre-processing liquid, and the post-processing liquid from the ink head 4, the pre-processing head 5, and the post-processing head 6. In this case, a large acceleration can be prevented from being applied to the pipe line P and the pressure fluctuation in the same manner can be reduced.

In the present preferred embodiment, the pre-processing head 5 is disposed at the left end of the arrangement range of the plurality of ink heads 4, and the sub-tank 7 for the pre-processing liquid is disposed at the left end of the plurality of sub-tanks 7. Therefore, as illustrated in FIG. 6, the length of the pipe line P for supplying the pre-processing liquid can be shortened, and the pipe line P can be disposed along the conveyance direction F as much as possible. Similarly, the post-processing head 6 is disposed at the right end of the arrangement range of the plurality of ink heads 4, and the sub-tank 7 for the post-processing liquid is disposed at the right end of the plurality of sub-tanks 7. Therefore, as illustrated in FIG. 7, the length of the pipe line P for supplying the post-processing liquid can be shortened, and the pipe line P can be disposed along the conveyance direction F as much as possible. By the arrangement of the pipe line P described above, a large acceleration can be prevented from acting on the liquid flowing inside, and the pressure fluctuation in each head can be reduced.

If the pre-processing head 5 or the post-processing head 6 is disposed between the ink heads 4, the arrangement range of the ink heads 4 becomes longer in the main scanning direction S, and the distance between the ink heads 4 and the ink sub-tanks 7 in the main scanning direction also becomes longer. However, the above-described arrangement can prevent such a situation.

Similarly, if the pre-processing liquid sub-tank 7 or the post-processing sub-tank 7 is disposed between the ink sub-tanks 7, the arrangement range of the ink sub-tanks 7 becomes longer in the main scanning direction S, and the distance between the ink head 4 and the ink sub-tanks 7 in the main scanning direction also becomes longer. However, the above-described arrangement can prevent such a situation.

In the embodiment, as described above, the post-processing head 6 is disposed on the opposite side of the pre-processing head 5 in the main scanning direction S, and the sub-tank 7 for the post-processing liquid is disposed on the opposite side of the sub-tank 7 for the pre-processing liquid in the main scanning direction S. Therefore, in addition to the fact that the length of the pipe lines P can be shortened as described above, the respective pipe lines P can be easily disposed without concentrating the head and the sub-tank for the processing liquid at one end portion in the main scanning direction S.

Figure 8:
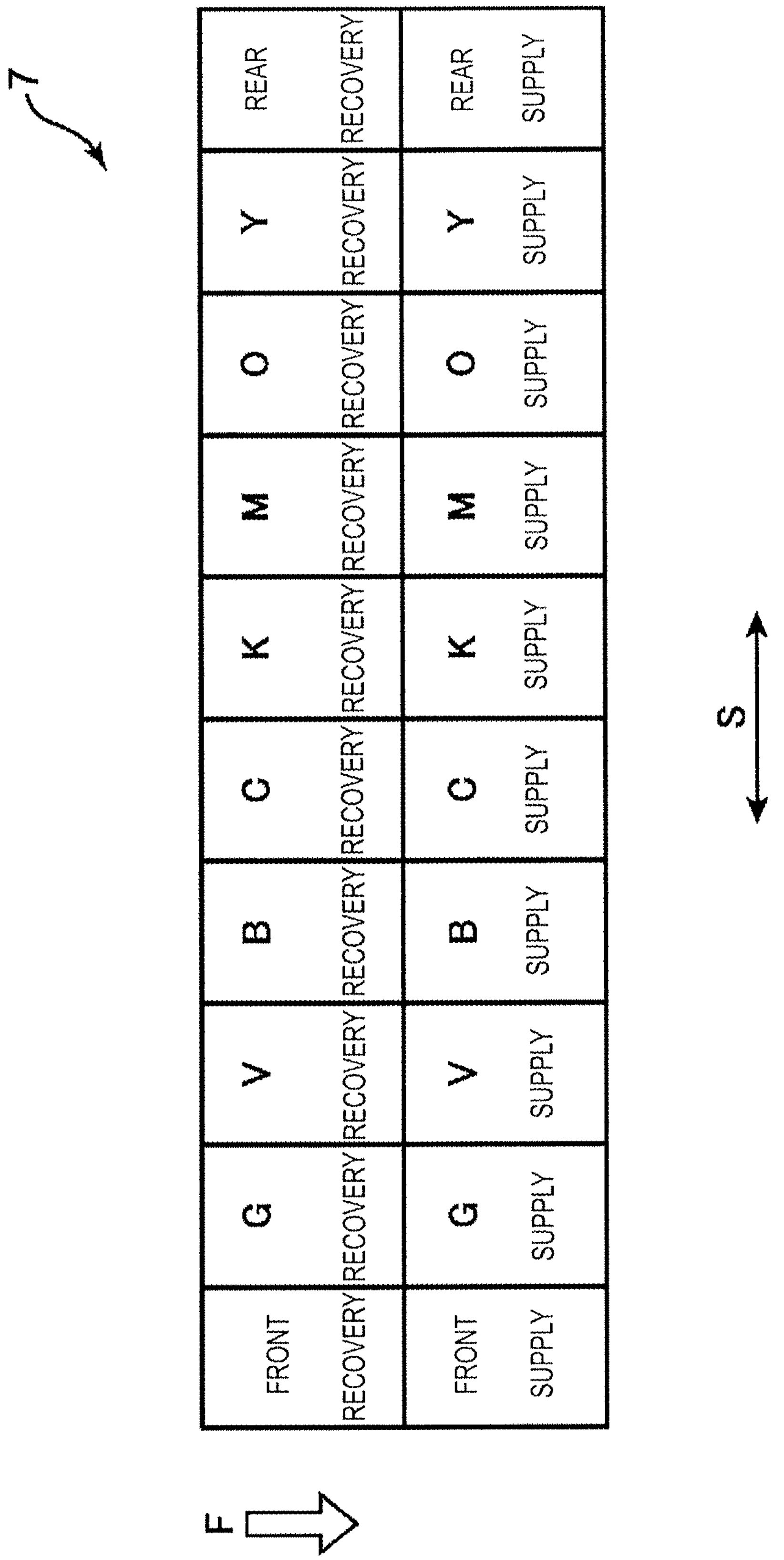
FIG. 8 is a schematic plan view illustrating an arrangement of a tank on a carriage according to a first modified embodiment of the present disclosure.

FIG. 8 is a schematic plan view illustrating the arrangement of the plurality of sub-tanks 7 on the carriage 3 according to the first modified embodiment of the present disclosure. In the embodiment described above, the plurality of sub-tanks 7 are disposed in a column in the main scanning direction S, and each sub-tank 7 is a supply tank. In this modified embodiment, as illustrated in FIG. 8, the plurality of sub-tanks 7 include a plurality of supply tanks (second column in FIG. 8) for accommodating ink of different colors to be supplied to the plurality of ink heads 4 and a plurality of recovery tanks (first column in FIG. 8) for accommodating ink of different colors to be recovered from the plurality of ink heads 4. The ink colors in FIG. 8 are the same as those in FIGS. 6 and 7.

The plurality of supply tanks and the plurality of recovery tanks are disposed at different positions in the conveyance direction F (direction orthogonal to the main scanning direction S), and include a plurality of sets of tanks each configured of a set of a supply tank and a recovery tank which accommodate ink of the same color. The plurality of sets of tanks are disposed side by side in the main scanning direction S, and more specifically, are disposed side by side in two columns.

Even in such a configuration, the same effect as in the previous embodiment can be achieved, and the liquid from each head can be recovered to the recovery tank in the purge operation and the like.

As illustrated in FIG. 8, the plurality of sub-tanks 7 also include a supply tank (processing liquid supply tank) and a recovery tank (processing liquid recovery tank) for the pre-processing liquid and the post-processing liquid. The supply tank and the recovery tank are disposed at different positions in the conveyance direction F, and are disposed side by side with the plurality of sets of tanks of each color in the main scanning direction S.

According to such a configuration, the length of the pipe line P (FIGS. 6 and 7) can be shortened since the distance between the supply tank and the recovery tank and the corresponding head for the pre-processing liquid and the post-processing liquid can be shortened.

Figure 9:
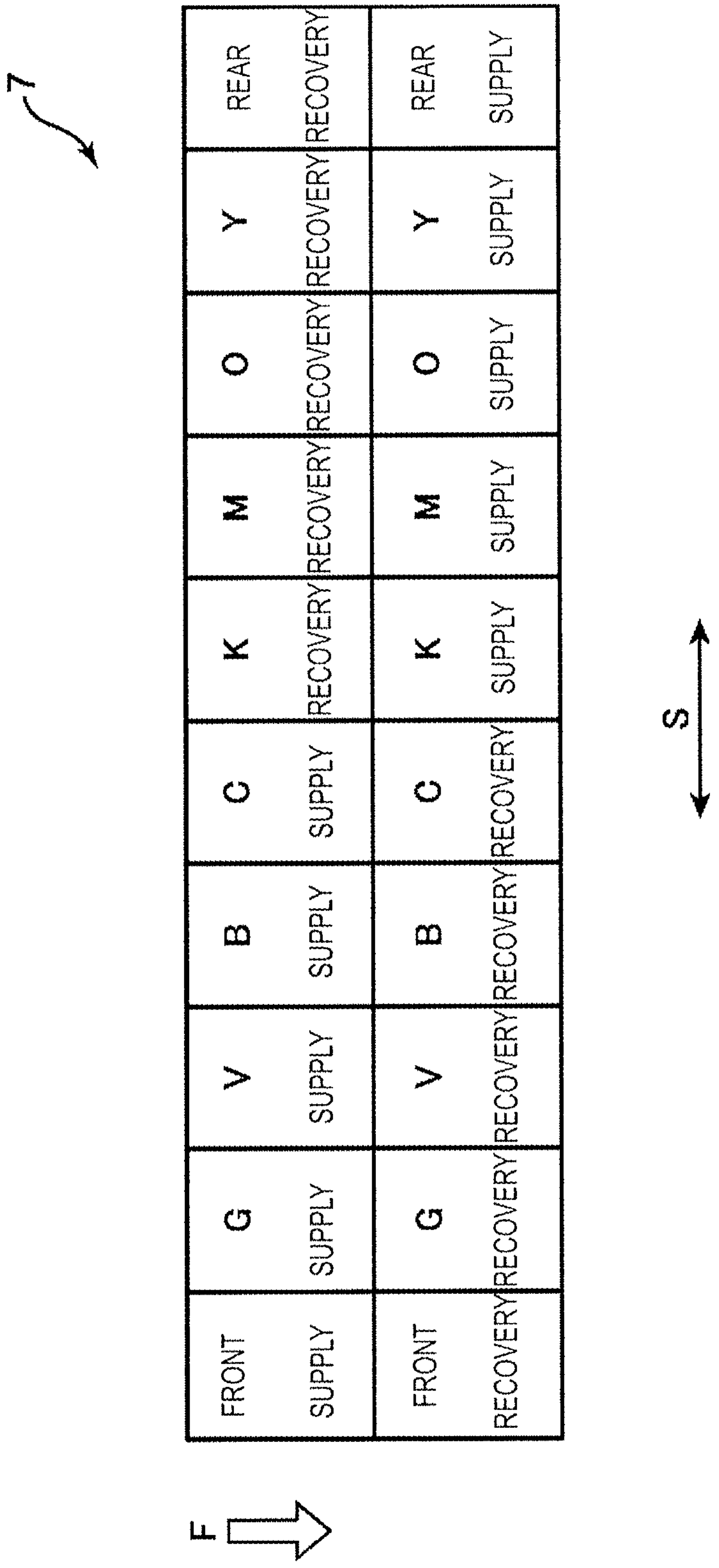
FIG. 9 is a schematic plan view illustrating an arrangement of a tank on a carriage according to a second modified embodiment of the present disclosure.

FIG. 9 is a schematic plan view illustrating an arrangement of tanks on a carriage according to a second modified embodiment of the present disclosure. Regarding the plurality of sets of tanks, in the first modified embodiment, the aspect in which the supply tank is disposed in the first column and the recovery tank is disposed in the second column has been described, but as illustrated in FIG. 9, a part of the supply tanks may be disposed in the first column and the other supply tanks may be disposed in the second column. Even in such a configuration, the same effect as that of the above-described embodiment can be obtained, and the degree of freedom of the layout of the head and the sub-tank on the carriage 3 can be increased. The degree of freedom is increased in the routing of the plurality of pipe lines P, and the pipe lines P can be prevented from complicatedly crossing each other.

Figure 10:
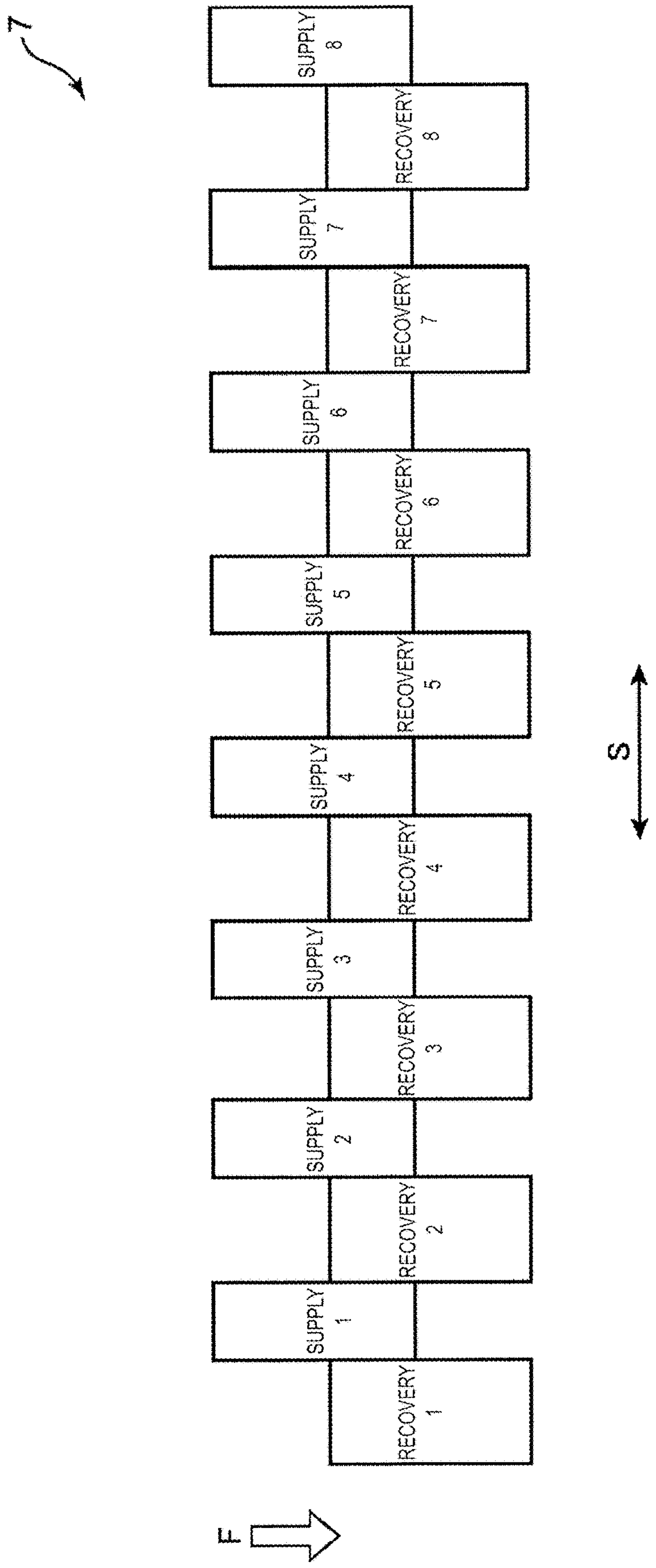
FIG. 10 is a schematic plan view illustrating an arrangement of a tank on a carriage according to a third modified embodiment of the present disclosure.

FIG. 10 is a schematic plan view illustrating an arrangement of tanks on a carriage according to a third modified embodiment of the present disclosure. In FIG. 10, the colors of the ink are not indicated, and the colors are indicated by numbers from the left. In FIG. 10, the tanks for the pre-processing liquid and the post-processing liquid are not illustrated. The supply tank and the recovery tank for each color are not limited to those disposed at the same position in the main scanning direction S. As illustrated in FIG. 10, the supply tank and the recovery tank may be disposed at positions shifted in the main scanning direction S and the conveyance direction F (in a staggered manner). In this case, the arrangement region of the plurality of sub-tanks 7 on the carriage 3 in the conveyance direction F can be reduced.

In each of the modified embodiments described above, at least one of the pre-processing liquid and the post-processing liquid may not have a recovery tank.

The present disclosure is not limited to the above-described embodiments, and may take the following forms.

(1) The ink heads 4 are not limited to those disposed in two columns in the carriage 3. The ink heads 4 may be disposed in one column or three or more columns.

(2) The colors of the ink are not limited to those illustrated in FIG. 6. The color of the ink may include other colors such as a special color, a light color, and a white color.

REFERENCE SIGNS

1 Ink jet printer (recording apparatus)
3 Carriage
4 Ink head
5 Pre-processing head
6 Post-processing head
7 Sub-tank (tank)
10 Device frame
12 Printing area
13 Maintenance area
14 Return area
20 Workpiece conveying portion
H Head arrangement region
W Workpiece

The invention claimed is:

1. A printing unit comprising
a carriage configured to reciprocate in a main scanning direction;
a plurality of ink heads mounted on the carriage and arranged in at least one column along the main scanning direction, the plurality of ink heads being configured to discharge ink; and
a plurality of tanks mounted on the carriage and disposed along the main scanning direction, the plurality of tanks accommodating ink, wherein
the plurality of ink heads comprise a pair of first ink heads disposed at both ends in the main scanning direction, the pair of first ink heads being configured to discharge ink of a same color,
the plurality of tanks comprise a first tank accommodating ink of a color corresponding to the pair of first ink heads,
in the carriage, an arrangement range in which the plurality of tanks are disposed is set to comprise the same region in the main scanning direction as an arrangement range in which the plurality of ink heads are disposed, and
the first tank is disposed at a central portion of the plurality of tanks in the main scanning direction.

2. The printing unit according to claim 1, wherein
the first tank is a supply tank accommodating ink to be supplied to the pair of first ink heads.

3. The printing unit according to claim 1, wherein
the first tank is a recovery tank accommodating ink recovered from the pair of first ink heads.

4. The printing unit according to claim 1, wherein
the plurality of ink heads comprise a plurality of pairs of second ink heads, each of the plurality of pairs of second ink heads comprising a pair of ink heads configured to discharge ink of a same color, the pair of ink heads disposed symmetrically in the main scanning direction between the pair of first ink heads,
the plurality of tanks comprise a plurality of second tanks, and in the plurality of second tanks, a second tank accommodating ink of a color corresponding to a second ink head located on an outer side in the main scanning direction among the plurality of pairs of second ink heads is disposed at a position that is the same as or closer to the first tank than a second tank accommodating ink of a color corresponding to a second ink head located on an inner side in the main scanning direction among the plurality of pairs of second ink heads.

5. The printing unit according to claim 4, wherein the plurality of second tanks are disposed on the same side in the main scanning direction with respect to the first tank.

6. The printing unit according to claim 1, wherein the plurality of ink heads are disposed in two columns in the main scanning direction, and an arrangement range of an ink head group in a first column is shifted to one end side in the main scanning direction with respect to an arrangement range of an ink head group in a second column, and among the plurality of tanks, the tank corresponding to the ink head group in the first column is disposed on the one end side in an arrangement range of the plurality of tanks, and the tank corresponding to the ink head group in the second column is disposed on another end side opposite to the one end side in the arrangement range of the plurality of tanks.

7. The printing unit according to claim 1, wherein the plurality of tanks comprise a plurality of supply tanks accommodating ink of different colors to be supplied to the plurality of ink heads, and a plurality of recovery tanks accommodating ink of different colors to be recovered from the plurality of ink heads, and the plurality of supply tanks and the plurality of recovery tanks comprise a plurality of sets of tanks, each of the plurality of sets of tanks comprising a set of a supply tank and a recovery tank disposed at different positions in a direction orthogonal to the main scanning direction, the set of a supply tank and a recovery tank accommodating ink of a same color, and the plurality of sets of tanks are disposed side by side in the main scanning direction.

8. The printing unit according to claim 7, wherein the plurality of sets of tanks are disposed in two columns in the main scanning direction.

9. The printing unit according to claim 7, further comprising:

a processing head mounted on the carriage and configured to discharge processing liquid;

a processing liquid supply tank mounted on the carriage and accommodating the processing liquid to be supplied to the processing head; and a processing liquid recovery tank mounted on the carriage and accommodating the processing liquid recovered from the processing head, wherein the processing liquid supply tank and the processing liquid recovery tank are disposed at different positions in a direction orthogonal to the main scanning direction, and are disposed side by side with the plurality of sets of tanks in the main scanning direction.

10. The printing unit according to claim 1, further comprising:

a pre-processing head mounted on the carriage and configured to discharge pre-processing liquid; and a pre-processing liquid tank mounted on the carriage and accommodating the pre-processing liquid, wherein the pre-processing head is disposed at an end in the main scanning direction of an arrangement range in which the plurality of ink heads are disposed, and the pre-processing liquid tank is disposed at an end in the main scanning direction on the same side as the pre-processing head with respect to an arrangement range in which the plurality of tanks are disposed.

11. The printing unit according to claim 1, further comprising:

a post-processing head mounted on the carriage and configured to discharge post-processing liquid; and a post-processing liquid tank mounted on the carriage and accommodating the post-processing liquid, wherein the post-processing head is disposed at an end in the main scanning direction of an arrangement range in which the plurality of ink heads are disposed, and the post-processing liquid tank is disposed at an end in the main scanning direction on the same side as the post-processing head with respect to an arrangement range in which the plurality of tanks are disposed.

12. The printing unit according to claim 1, further comprising:

a pre-processing head mounted on the carriage and configured to discharge pre-processing liquid;

a pre-processing liquid tank mounted on the carriage and accommodating the pre-processing liquid;

a post-processing head mounted on the carriage and configured to discharge post-processing liquid; and a post-processing liquid tank mounted on the carriage and accommodating the post-processing liquid, wherein the pre-processing head is disposed at an end in the main scanning direction of an arrangement range in which the plurality of ink heads are disposed, the pre-processing liquid tank is disposed at an end in the main scanning direction on the same side as the pre-processing head with respect to an arrangement range in which the plurality of tanks are disposed, the post-processing head is disposed at an end in the main scanning direction on a side opposite to the pre-processing head in an arrangement range in which the plurality of ink heads are disposed, and the post-processing liquid tank is disposed at an end in the main scanning direction on the same side as the post-processing head with respect to an arrangement range in which the plurality of tanks are disposed.

13. A recording apparatus comprising:

the printing unit according to claim 1; and a conveying portion configured to convey a recording medium in a direction intersecting the main scanning direction.

* * * * *